3,002,894
METHOD AND DEVICE FOR CONTROLLING THE GROWTH OF MICROBIAL CULTURES
Karl Rungaldier, Klagenfurt-Limmersach, Carinthia, and Ernst Braun, Vienna, Austria, assignors to Patentauswertung Vogelbusch Gesellschaft m.b.H., Vienna, Austria, a company of Austria
Filed Nov. 9, 1959, Ser. No. 851,733
Claims priority, application Austria Nov. 14, 1958
9 Claims. (Cl. 195—117)

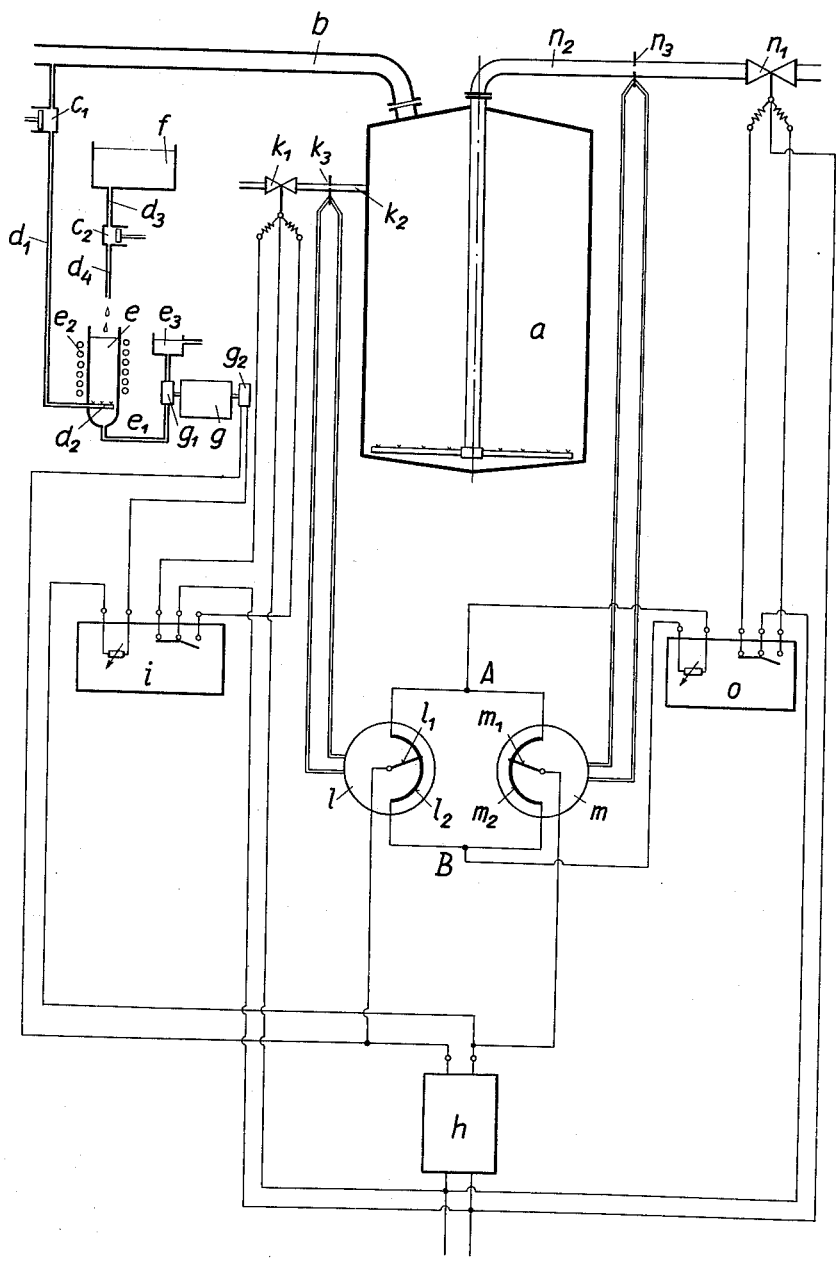

This invention relates to a method and a device for controlling the growth of aerobic microbial cultures producing a volatile substance, and more particularly to a method and a device for controlling the supply of nutrient solution and air during growth of yeast in aerated mashes for producing baker's yeast and the like, in which alcohol is produced by fermentation.

In large scale yeast culture, as, for example, in the baker's yeast industry, the rate of growth and the yield of yeast depend on several factors. The quality and quantity of the inoculum, the rate of supply of the nutrient materials and air substantially affect the growth and the properties of the yeast produced.

The interdependence of the principal factors which determine the biological processes involved is known as the Pasteur Effect (see Jorgensen, "Mikroorganismen in der Gaerungsindustrie," 1956, page 280). A shortage of oxygen and an excess of nutrient solution reduce the respiration rate of the yeast cells and enhance fermentation so that alcohol is formed from the nutrient material in preference to new yeast cells. This alcohol is partly lost by entrainment with the air which is passed through the mash in a multiplicity of fine streams to satisfy the air requirements of the yeast cells. Even if the alcohol formed could be fully assimilated by the growing yeast as a building material for dry yeast substance, the portion of the alcohol which is driven off by the air is lost. It is necessary for most economical operation that the air supply be adequate to reduce fermentation, and be held to the lowest possible value to reduce alcohol loss by entrainment with the air.

When yeast is grown in highly concentrated mashes, even relatively small absolute amounts of alcohol cause high alcohol concentrations in the relatively small volume of mash. The loss of alcohol carried away by the passing air becomes substantial, and the yeast yield is correspondingly reduced. It is necessary for economical yeast production to keep the fermentation rate at a low value.

It has previously been proposed to determine the oxygen and carbon dioxide content of the gases withdrawn from the fermentation vat, to ascertain the condition of the mash from the results of the determination, and to regulate the supply of nutrient solution and air accordingly. The calculations required in determining the alcohol content of the mash from the gas analysis are involved, and very minute inaccuracies of the gas analysis lead to final errors in the alcohol value which may be greater than the changes of the value to be determined.

It has also been previously suggested to control the supply of air and nutrient solution to a growing yeast culture according to the alcohol content of the mash which is to be determined by bath distillation. Because of the time required for an analysis by distillation, the composition of the mash may vary significantly before the results of the analysis are available.

To overcome the shortcomings of the known methods, the present invention proposes to control the addition of nutrient solution and the supply of air to a growing yeast culture according to the instantaneous alcohol content of the gases exhausted from the fermentation vat.

The exhaust gases are saturated with moisture, and the alcohol and water content of the gases reflects the composition of the mash. Under the conditions of practical yeast production, the alcohol content of the vapors driven off by the passing air is approximately twelve times that of the alcohol concentration in the mash.

It has now been found that this relationship is independent of the specific method of mash aeration employed, of the mash level in the vat, and of other variables encountered in commercial operation. The alcohol content of the vapors exhausted is a function of the vat temperature and of the alcohol content of the mash only. Since the fermentation temperature is normally held constant during fermentation, the alcohol concentration in the vapors accurately reflects the alcohol content of the mash.

For fermentation at 28° C., the relationship of the alcohol contents of the exhaust gases and of the mash respectively can be expressed with adequate accuracy by the equation $$y = 4kx$$

in which:

$y=$ alcohol content of the exhaust gases in cm.$^3$ of liquid alcohol per m.$^3$ of gas at standard conditions of temperature and pressure (STP),
$x=$ alcohol content of the mash in percent by volume, and
$k=1$ cm.$^3$/(percent by volume) $\times$ (m.$^3$ STP)

This empirical relationship expresses that one cubic meter STP of the exhaust gases withdrawn from a mash containing 0.2 percent alcohol by volume at 28° C. contains 0.8 cm.$^3$ of alcohol. The alcohol content of the exhaust gases can be translated into an electrical signal without complicated calculations and indirect measurements since other process variables such as the method of aeration and the height of the mash in the vat have no measurable influence on the alcohol content of the exhaust gases at a given temperature. The alcohol content of the exhaust gases can be determined directly. Adjustment of the air and nutrient supply for optimum conditions of respiration, and thus for propagation of the microorganisms can be controlled by the electrical signal with great precision and very rapidly because the signal for the control operation is derived from a single variable which is capable of direct measurement.

It is very advantageous in this respect that the alcohol content of the condensable vapors in the exhaust gases is higher by a factor of approximately twelve than that of the mash. The method of the invention thus is inherently more precise than any method based on the alcohol content of the mash itself. Any variation in the alcohol content of the mash is reflected in a multiplied change in the alcohol content of the exhaust gas vapors.

The precision of measurement which can be achieved by the method of the invention will become apparent from a numerical example:

A mash containing 0.2% alcohol by volume is fermented at 28° C. Each cubic meter STP of air passing through the mash is saturated with water vapor and thus contains 32.1 g. of water, but also 0.8 cm.$^3$ or 0.638 g. alcohol. The alcohol concentration of the condensable vapors is thus $$\frac{0.638}{32.1 + 0.638} \cdot 100 = 1.94\% \text{ by volume}$$

The alcohol content of the mash, and thus any change in the alcohol content, is reflected by a twelve-fold corresponding value in the alcohol content of the exhausted vapors.

Alcohol can readily be determined with high precision. The values obtained can be made accurate to three significant figures. Since the sample size, that is the quantity of air analyzed, can readily be increased to suit requirements, the precision of the method of the invention is practically unlimited.

The alcohol content of the exhaust gases is preferably determined colorimetrically by the known reaction of alcohol with hexavalent chromium in acid solution. Passage of alcohol vapors into a solution of potassium dichromate in strong sulfuric acid causes a gradual change in the color of the solution from a bright orange to brown and finally to green. The color change is readily translated into electrical signals which may be amplified, if desired, and which are then employed to actuate the actual control mechanism for controlling the flow of air and nutrient solution.

The translation of the color change of the test solution into a low voltage electrical signal may be performed by means of a conventional photoelectric colorimeter. A beam of light of suitable wave length is passed through the solution obtained by the reaction of the unknown amount of alcohol with a known chromate solution. The absorption of the light beam by the solution varies with the color of the test solution, and the output of a photoelectric cell is controlled by the portion of the light beam which passes through the solution. The alcohol determination by colorimetric analysis of a chromate test solution is well known and is extremely precise.

It is preferred to modify the known method in such a manner that the alcohol determination is made continuous so that substantially instantaneous values of alcohol concentration in the mash are continuously obtained. Closest control of the fermentation process is thus achieved. The output of the photoelectric cell can be made directly proportional to the alcohol content of the mash. The alcohol content can thus be read directly from a galvanometer. The photoelectric cell output may also be amplified and employed to actuate a servo motor for operating control elements in the lines supplying air and nutrient solution to the fermentation vat. The rate of nutrient solution supply may be controlled either with a two-position valve which is either open or closed or by means of a throttling valve which continuously varies the flow rate. The air is preferably controlled in such a manner that the amount of air fed to the fermentation vat is directly proportional to the amount of nutrient solution. When the air control valve is coupled to the nutrient supply valve for joint operation, the air supply is held at an optimum value automatically. Aeration can thus be held to the minimum required for proper utilization of the nutrient material.

While the determination of the alcohol content in the exhaust gases is preferably based on a chemical reaction resulting in a color change of a reagent solution, it will be understood that the alcohol determination may be performed in any other manner without departing from the scope of this invention.

It is specifically contemplated to pass a measured amount of exhaust gases through a measured volume of liquid and to determine the resulting alcohol concentration in the liquid by a refractometer the reading of which is translated into a low voltage signal.

A preferred apparatus for performing the method of the invention is illustrated by way of example in the attached drawings in which the sole drawing schematically illustrates a fermentation vat equipped with the control device of the invention.

Referring now to the drawing, there is shown a fermentation vat $a$ provided with an exhaust pipe $b$ from which a gas sample is drawn by a metering pump $c_1$ and is conducted through a pipe $d_1$ into a reaction vessel $e$. A multiple nozzle arrangement such as a perforated ring pipe $d_2$ releases the stream of exhaust gas substantially uniformly over the cross section of the vessel $e$. A second metering pump $c_2$ withdraws a solution of potassium dichromate in strong sulfuric acid from a storage tank $f$ through a pipe $d_3$ and delivers it to the reaction vessel $e$ through the pipe $d_4$. The contents of the reaction vessel $e$ are kept at a suitable reaction temperature, e.g. 95° C., by means of a heating coil $e_2$.

An amount of liquid corresponding to the material supplied through the pipes $d_1$ and $d_4$ is withdrawn from the bottom of the reaction vessel $e$ by a tube $e_1$ which leads to an overflow arrangement $e_3$ by means of which the liquid level in the reaction vessel $e$ is held substantially constant.

The gas released from the perforated ring pipe $d_2$ rises through the acid solution in the reaction vessel and the alcohol contained therein is oxidized to acetic acid. The large surface area of the many small bubbles formed contributes to the rapidity of the reaction which is almost instantaneous at the preferred reaction temperature.

The amount of liquid leaving the reaction vessel $e$ through the tube $e_1$ passes in continuous stream through the cuvette $g_1$ of the photoelectric colorimeter $g$ the output of which controls the position of the potentiometer $g_2$. The potentiometer is arranged in circuit with a source of constant voltage $h$ and actuates a hoop drop controller $i$ the position of which thus is representative of the light intensity received by the photoelectric cell of the colorimeter. The controller $i$ which is capable of assuming three positions is sensed periodically. If it is in the position corresponding to the desired range of light intensity, and thus to the desired alcohol content of the mash, no pulse is transmitted by a detecting feeler to the motor valve $k_1$ which throttles flow of molasses nutrient to the vat $a$ through the supply line $k_2$. If the controller $i$ is not in the desired position, an opening or closing pulse is generated each time the controller is sensed until the composition of the mash is restored to the desired alcohol concentration and this concentration is reflected in a reading of the colorimeter $g$.

The arrangement described above controls the supply of nutrient solution in such a manner that a constant alcohol concentration is maintained in the fermentation vat $a$. The supply of nutrient is thereby also held proportional to the increase in the amount of yeast in the vat.

For the reasons outlined above, it is preferred to adjust the air supply in proportion to the yeast growth, and thus in proportion to the flow of nutrient material.

The flow rate of the molasses in the supply line $k_2$ is sensed by a flow meter comprising a constriction $k_3$ in the line $k_2$ and a ring balance $l$ communicating with the line $k_2$ upstream and downstream of the constriction $k_3$. The flow rate sensed by the ring balance is indicated by a pointer $l_1$ which is coupled to a potentiometer $l_2$. The potentiometer $l_2$ is arranged in a Wheatstone bridge circuit with the potentiometer $m_2$. The bridge circuit is energized by the constant voltage source $h$. The resistance of the potentiometer $m_2$ is proportional to the position of the pointer $m_1$ of the ring balance $m$ which measures the amount of flow passing through the air supply line $n_2$ past a constriction $n_3$ to the fermentation vat $a$. The constrictions $k_3$, $n_3$ and the ring balances, $l$, $m$ are dimensioned in such a manner that proportional rates of flow of air and nutrient solution result in proportional values of resistance in the potentiometers $l_2$ and $m_2$. When the controller $i$ changes the position of the nutrient valve $k_1$, the pointer $l_1$ of the ring balance $l$ will change its position corresponding to the change in molasses flow rate. A potential is generated between the terminals A and B of the Wheatstone bridge circuit and the hoop drop controller $o$ is moved from its neutral position. The hoop drop controller $o$ operates in the same manner as controller $i$. It is periodicaly sensed, and its displacement causes a controlling pulse to be transmitted to the motor valve $n_1$ in the air line $n_2$. These pulses are repeated periodically during each sensing of the controller $o$ until the terminals A and B are at the same potential, that is, until proportionality of molasses and air flow has been restored.

It will be appreciated by those skilled in this art that the control arrangement employed may be modified in many ways without departing from the spirit and scope of this invention. Other well known devices may be employed to control the rate of flow of the nutrient solution, the air of aeration or both according to the color change of a test solution reacted with the exhaust gases from the fermentation vat or another physical property which can be readily and automatically related to the alcohol content of the exhaust gases, and different apparatus may be employed to control flow of either the nutrient solution or the air of aeration in any desired proportional ratio to the flow rate of the other fluid.

The metering pumps $c_1$ and $c_2$ preferably have a common drive to ensure their synchronous operation. The concentration of hexavalent chromium in the test solution is preferably selected in such a manner as to result in a maximum change in colorimeter output for variations in alcohol concentration within the operating range of the fermentation vat $a$. It has been found most advantageous to calibrate the device illustrated by empirical methods to adapt it to the desired operating conditions. As soon as the calibration is accomplished, the device will maintain substantially constant alcohol concentration in the vat as long as the fermentation temperature is held constant.

The mode of operation of the afore-described device will now be illustrated by a specific example.

A fermentation vat of 15,000 liters gross capacity is to be operated at an alcohol concentration of 0.2 percent by volume of the mash. The nutrient molasses solution is adjusted to 42° Balling, that is, the molasses fed to the vat with each liter of nutrient solution correspond to $$\frac{1 \cdot 42 \cdot 1.2}{78} = 0.646 \text{ kg. molasses of } 78° \text{ Balling}$$

Under conditions of steady operation, 200 liters per hour of nutrient solution (129 kg. molasses per hour) are fed to the vat. The 129 kg. of molasses are transformed by fermentation into 111 kg. of yeast substance per hour of which 30% are dry yeast substance, corresponding thus to 33.3 kg. of dry yeast substance grown per hour. It is customary to operate with an air supply of 26.7 m.$^3$ air STP for each kilogram of newly formed dry yeast substance. The air requirement of the culture accordingly is 888 m.$^3$ STP per hour, and this amount is fed to the vat.

The metering pump which draws an alcohol-bearing exhaust gas sample to the reaction vessel has a capacity of 600 cm.$^3$ per minute. The capacity of the reaction vessel is 6 cm.$^3$. In order to provide space for the gas bubbles passing through the reaction liquid, the actual liquid content of the reaction vessel does not exceed 3 cm.$^3$. The mixture of reacting liquid and gas bubbles is held at a temperature of 95° C. 2 cm.$^3$ of chromate solution per minute are fed to the reaction vessel by the metering pump $c_2$. The reagent solution in the storage tank $f$ is prepared by dissolving 2.45 g. potassium dichromate in 500 ml. water in a one-liter volumetric flask, and filling the flask with concentrated sulfuric acid. The cuvette $g_1$ has a capacity of 4 cm.$^3$. All connecting pipes and tubes are made as short as possible. The light beam the absorption of which is measured is filtered with a blue filter.

The colorimeter and the controller $i$ are arranged in such a manner that the full range of colorimeter output corresponds to a change in alcohol content in the mash between 0% and 0.35%. The position of the controller $i$ is sensed every 4 minutes.

After 30 minutes operation, the alcohol concentration of the mash has fallen to 0.18%, and the valve $k_1$ receives a pulse from the controller $i$ which increases the rate of molasses flow from 200 to 205 liters per hour. The pointer $l_1$ of the ring balance $l$ moves from its position of bridge equilibrium and the potential difference generated at the terminals A and B causes displacement of the controler $o$. Upon subsequent sensing of the controller, a pulse is transmitted to the motor valve $n_1$ to increase the air flow. The valve continues opening on each repeated sensing of the controller $o$ until the pointers $l_1$ and $m_1$ occupy corresponding positions and the terminals A and B are at the same potential.

If the increased feed rate leads to an alcohol concentration of more than 0.2% in the mash, the control arrangement again reduces the flow rates of both the molasses and of air until the desired operating conditions are restored.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention set forth in the appended claims.

What is claimed and desired to be protected by Letters Patent of the U.S. is:

1. In a method of growing yeast in an aqueous culture in which alcohol is produced by fermentation of a nutrient material, the steps of passing air through said culture at a rate permitting saturation of said air with the moisture and the alcohol of said culture; sensing the concentration of said alcohol in said air after passage through said culture; generating a signal responsive to said sensed concentration; and controlling the supply of growth controlling material to said culture by said signal.

2. In a method as set forth in claim 13, said alcohol concentration being sensed and said signal being generated by reacting a measured amount of said air after it passes through said culture with a solution containing hexavalent chromium for reaction of said alcohol therein with said chromium and for a change in the color of said solution and by; varying the output of a photoelectric cell responsive to the color change of said solution.

3. In a method as set forth in claim 1, said growth controlling material being said nutrient material.

4. In a method as set forth in claim 1, said growth controlling material being said air and said nutrient material.

5. In an arrangement for controlled growth of an aerobic microbial culture producing a substance volatile with a respiration supporting gas from a nutrient material, in combination, a container; a liquid medium containing a microbial culture in said container; a supply of nutrient material; conduit means communicating with said supply and said container for supplying nutrient material to said culture; conduit means for supplying a respiration supporting gaseous material to said container for passage through said medium; exahust means for withdrawing said gaseous material from said container after passage through said medium; means for automatically determining the amount of volatile substance in said withdrawn gaseous material and to generate a signal responsive to the presence of a predetermined amount of said substance; and control means in at least one of said conduit means responsive to said signal for controlling the flow of at least one of said materials.

6. In an arrangement for controlled growth of an aerobic microbial culture producing a substance volatile with a respiration supporting gas from a nutrient material, in combination, a container; a liquid medium containing a microbial culture in said container; a supply of nutrient material; conduit means communicating with said supply and said container for supplying nutrient material to said culture; conduit means for supplying a respiration supporting gaseous material to said container for passage through said medium; exhaust means for withdrawing said gaseous material from said container after passage through said medium; means for automatically reacting a measured amount of said withdrawn gaseous material with a reagent adapted to undergo a measurable change relate in a known manner to the amount of volatile substance in said withdrawn gaseous material; means adapted to sense said change and to generate a signal responsive to the presence of a predetermined amount of said substance; and control means in at least one of said conduit means responsive to said signal for controlling the flow of at least one of said materials.

7. In an arrangement for controlled growth of an aerobic microbial culture producing a substance volatile with a respiration supporting gas from a nutrient material, in combination, a container; a liquid medium containing a microbial culture in said container; a supply of nutrient material; conduit means communicating with said supply and said container for supplying nutrient material to said culture; conduit means for supplying a respiration supporting gaseous material to said container for passage through said medium; exhaust means for withdrawing said gaseous material from said container after passage through said medium; means for automatically reacting a measured amount of said withdrawn gaseous material in continuous flow with continuously supplied amounts of a reagent adapted to undergo a measurable color change related in a known manner to the amount of volatile substance in said withdrawn gaseous material; colorimeter means adapted to continuously sense change and to generate a signal responsive to the presence of a predetermined amount of said substance; and control means in at least one of said conduit means responsive to said signal for controlling the flow of at least one of said materials.

8. In an arrangement for controlled aerobic growth of yeast which produces alcohol from a nutrient material, in combination, a container; an aqueous yeast culture in said container; a supply of nutrient material; conduit means communicating with said supply and said container for supplying nutrient material to said culture; conduit means for supplying air to said container for passage through said culture and entrainment of alcohol therefrom; a reaction vessel; a supply of acid chromate solution in said reaction vessel; exhaust means for withdrawing air from said container after passage through said culture and for passing the same through said chromate solution in said reaction vessel; colorimeter means for sensing the color change resulting from the reaction of the entrained alcohol in said air with said chromate solution in said vessel and for generating an electrical signal responsive to said color change; an electrically actuated valve in one of said conduits; and circuit means connecting said colorimeter means and said valve for controlling the same responsive to said color change.

9. In an arrangement as set forth in claim 8, a supply of acid chromate solution; and means for continuously replenishing the solution in said reaction vessel from said supply, said air being continuously withdrawn from said container and passed through said reaction vessel by said exhaust means.

References Cited in the file of this patent

UNITED STATES PATENTS 2,013,727 Douglass et al. ---------- Sept. 10, 1935